United States Patent [19]

Handl

[11] Patent Number: 4,578,420

[45] Date of Patent: Mar. 25, 1986

[54] ERASER WITH THERMOPLASTIC BINDER

[75] Inventor: Werner Handl, Altdorf, Fed. Rep. of Germany

[73] Assignee: J. S. Staedtler, Nuremburg, Fed. Rep. of Germany

[21] Appl. No.: 233,292

[22] Filed: Feb. 10, 1981

[30] Foreign Application Priority Data

Feb. 13, 1980 [DE] Fed. Rep. of Germany ....... 3005332

[51] Int. Cl.$^4$ .......................... C08K 5/01; C08L 53/02
[52] U.S. Cl. ..................................... 524/490; 524/491; 524/505; 525/95; 525/97
[58] Field of Search .................. 260/33.6 AQ, 33.6 A, 260/33.6 PQ, 33.6 UA, 23.7 M, 42.47; 525/97, 314, 99, 289; 524/490, 505, 491

[56] References Cited

U.S. PATENT DOCUMENTS

| | | | |
|---|---|---|---|
| 3,400,091 | 9/1968 | Stumpe | 260/33.6 AQ |
| 3,526,606 | 9/1970 | Minekawa et al. | 260/33.6 AQ |
| 3,562,204 | 2/1971 | Breen | 260/42.47 |
| 3,676,387 | 7/1972 | Lindlof | 260/28.5 B |
| 3,738,951 | 6/1973 | Middlebrook | 260/23.7 M |
| 3,795,651 | 3/1974 | Yamaguchi et al. | 260/33.6 AQ |
| 3,827,999 | 8/1974 | Crossland | 260/33.6 AQ |
| 3,939,112 | 2/1976 | Needham | 260/33.6 AQ |
| 3,950,292 | 4/1976 | Cooper | 525/99 |
| 3,956,223 | 5/1976 | Chiang et al. | 525/97 |
| 4,001,167 | 1/1977 | Tungseth et al. | 260/33.6 AQ |
| 4,017,436 | 4/1977 | Tabana et al. | 260/33.6 AQ |
| 4,107,124 | 8/1978 | Himes | 260/33.6 AQ |
| 4,203,884 | 5/1980 | Coran et al. | 260/33.6 PQ |
| 4,236,715 | 12/1980 | Middlebrook | 260/33.6 AQ |
| 4,244,855 | 1/1981 | Cox et al. | 260/42.47 |

FOREIGN PATENT DOCUMENTS

| | | | |
|---|---|---|---|
| 49-30507 | 8/1974 | Japan | 525/314 |
| 50-55652 | 5/1975 | Japan | 524/505 |

OTHER PUBLICATIONS

Chem. Abst., vol. 85 (178797h) "Eraser", 1976 Cermak et al.
Derwent Abst. 5126A/03 (J52143121) 11-29-77, "Plastic Erasers . . . ".
Derwent Abst. 48679C/28, 5-26-80, "Vinyl Chloride Resin Comp for Erasers . . . ", Mitsubishi.
Derwent Abst. 91219 C/51, 11-6-80, "Eraser . . . ", J55142034, Yoshida.
Derwent Abst. 34669X/19, 3-23-76, "Eraser Comp. . . . ".
Derwent Abst. 78454Y/44, 9-20-77, "Plastic Eraser Comp.".

*Primary Examiner*—Herbert J. Lilling
*Attorney, Agent, or Firm*—Toren, McGeady, Stanger, Goldberg & Kiel

[57] ABSTRACT

An eraser composition composed of conventional fillers and additives wherein the binder is a styrene-butadiene-styrene block polymer having a butadiene portion of 10 to 40%. The eraser composition can be easily extruded using simple commercial machines presently available and thus is inexpensive to manufacture. Furthermore, the use of this particular material as a binder produces a superior eraser composition.

3 Claims, No Drawings

4,578,420

ERASER WITH THERMOPLASTIC BINDER

BACKGROUND OF THE INVENTION

1. Field of the Invention

The invention relates to an eraser, composed of fillers, a binder of a thermoplastic material based on synthetic rubber as the binder, and possibly other additions.

2. Description of the Prior Art

In a known eraser of this type, described in Belgian Pat. No. 673,229, materials, such as, polychloroprene, chlorosulfonated polyethylene, polybutadiene, polyacrylonitrile or polyisobutylene are used as binders. Moreover, factice can also be used in this case.

However, this eraser is disadvantageous primarily because of either an additional vulcanization process or a peroxidic crosslinking is required for the particular binders. In addition, as a rule, large amounts of softeners, such as, for example, chloroparaffins, which have a great tendency to migrate, are required. When factice (chlorosulfur rape oil) is used which is a natural product whose composition cannot be exactly defined, it is not possible to obtain consistency in the final products without continuous adjustments to the process, particularly, with respect to the hardness, abrasion properties, or the absorption of softeners.

In accordance with another proposal in U.S. Pat. No. 3,738,951, a butadiene-styrene block polymer with a butadiene to styrene ratio of 4:1 to 1:1 (80:20 to 50:50 percent by weight) is to be used as the binder. Furthermore, in this case, the use of factice and of a naphthenic oil as the softeners is suggested.

Also, there are the disadvantages resulting from the problems created by the use of factice, and the aromatic substances in the naphthenic oils may be physiologically harmful.

SUMMARY OF THE INVENTION

I have discovered an eraser which does not have the above-mentioned disadvantages. More specifically, the eraser of the present invention does not require an additional production process, does not have the tendency to migrate, and can produce consistent products which are physiologically harmless. In addition, the present eraser can be extruded using simple, commercially available machines or can be produced extremely inexpensively, without complicated manufacturing devices and methods, by injection molding.

More specifically, the present invention relates to an eraser composition composed of a styrene-butadiene-styrene block polymer (sometimes referred to as SBS block polymer) with a butadiene portion of 10 to 40% by weight as a binder and conventional fillers and additives.

The disadvantages of the presently known erasers, in which the butadiene portion is equal to or substantially greater than the styrene portion, can be avoided and especially inexpensive and qualitatively excellent erasers can be produced with a styrene-butadiene-styrene block polymer in which the styrene portion preponderates as in the present invention.

DESCRIPTION OF THE PREFERRED EMBODIMENT

It is particularly advantageous with the present invention that 5 to 25% by weight of stereospecific, liquid, low-viscosity polybutadiene is admixed with the binder of the invention. The admixed polybutadiene preferably has a molecular weight of 1000 to 4000 and a viscosity of 700 to 3000 mPa.s.

Furthermore, it is advantageous when the polybutadiene has 70 to 80% 1,4 cis-double bonds, 15 to 30% 1,4 trans-double bonds and 1 to 5% vinyl double bonds.

It has also been found advantageous to add 1 to 20% by weight polynorbornene (a polymer of di-cyclopentadiene) as an additional binder.

This addition serves to improve and increase the abrasion which is particularly important for satisfactory functioning of the eraser.

Since polynorbornene has a relatively large specific surface and an extremely good capability to absorb fats and oils, its presence makes it possible to achieve an especially fine and absorptive abrasion and to significantly improve the erasing efficiency.

Suitable fillers for use in the present invention include those conventionally known, such as, chalk, kaolin, amorphous silicic acid, pumice stone, corundum, powdered quartz and glass.

The following examples illustrate the invention. The quantities are given in parts by weight, and since they are with reference to a total of 100 parts, are simultaneously given in percent by weight.

EXAMPLE 1

| | Total Parts |
|---|---|
| Styrene-butadiene-styrene block polymer with 60% styrene portion | 13.0 |
| Polybutadiene MG 1500 | 12.0 |
| Chalk (calcium carbonate) 1–6μ | 74.9 |
| 2,2'-isobutylidene-bis-(4,6-dimethylphenol) | 0.1 |

EXAMPLE 2

| | |
|---|---|
| Styrene-butadiene-styrene block polymer with 80% styrene portion | 11.0 |
| Polybutadiene MG 1500 | 13.0 |
| Chalk (calcium carbonate) 1–6μ | 70.9 |
| Polynorbornene | 5.0 |
| 2,2,'-methylene-bis-(4-methyl-6-tert.-butyl-phenol) | 0.1 |

EXAMPLE 3

| | |
|---|---|
| Styrene-butadiene-styrene block polymer with 70% styrene portion | 15.0 |
| Polybutadiene MG 3000 | 5.0 |
| Chalk (calcium carbonate) 1–10μ | 74.0 |
| Aliphatic hydrocarbon with 18–36 carbon atoms, TP 50–60° C., MG 360–420 | 6.0 |

EXAMPLE 4

| | |
|---|---|
| Styrene-butadiene-styrene block polymer with 80% styrene portion | 18.0 |
| Polybutadiene | 12.0 |
| Chalk (calcium carbonate) 10–40μ | 35.0 |
| Pumice powder | 34.9 |
| Di-lauryl-3,3'-thiodipropionate | 0.1 |

EXAMPLE 5

| | |
|---|---|
| Styrene-butadiene-styrene block polymer with 60% styrene portion | 12.0 |
| Polybutadiene MG 3000 | 4.0 |
| Polynorbornene | 8.0 |
| Aliphatic hydrocarbon with 30–40 carbon atoms, TP 62–92° C., MG 580–700 | 8.0 |
| Chalk (calcium carbonate) 1–5μ | 67.9 |
| Di-lauryl-3,3'-thiodipropionate | 0.1 |

EXAMPLE 6

| | |
|---|---|
| Styrene-butadiene-styrene block polymer with 60% styrene portion | 20.0 |
| Aliphatic hydrocarbon (as in Example 3) | 15.0 |
| Amorphous silicic acid | 10.0 |
| Chalk | 54.7 |
| Antioxidants | 0.2 |
| Dye | 0.1 |

EXAMPLE 7

| | |
|---|---|
| Styrene-butadiene-styrene block polymer with 80% styrene portion | 20.0 |
| Polybutadiene MG 1500 | 15.0 |
| Kaolin | 59.7 |
| Antioxidants | 0.2 |
| Polynorbornene | 5.0 |
| Dye | 0.1 |

EXAMPLE 8

| | |
|---|---|
| Styrene-butadiene-styrene block polymer with 70% styrene portion | 25.0 |
| Polynorbornene | 15.0 |
| Powdered quartz | 50.0 |
| Aliphatic hydrocarbon (as in Example 5) | 10.0 |

What is claimed is:

1. In an eraser composed of fillers and a binder of a thermoplastic material of a synthetic rubber, the improvement consisting essentially of said binder being a styrene-butadiene-styrene block polymer with a butadiene portion of 10 to 40% and containing a straight-chain or branched aliphatic hydrocarbon compound having a formula ranging between $C_{18}H_{38}$ to $C_{43}H_{88}$.

2. In an eraser composed of fillers and a binder thermoplastic material of a synthetic rubber, the improvement which comprises said binder being a styrene-butadiene-styrene block polymer with a butadiene portion of 10 to 40% and containing 5 to 25% by weight of a stereospecific liquid low-viscosity polybutadiene and which further comprises a straight-chain or branched aliphatic hydrocarbon compound having a formula ranging between $C_{18}H_{38}$ to $C_{43}H_{88}$.

3. In an eraser composed of fillers and a binder of a thermoplastic material of a synthetic rubber, the improvement which comprises said binder being a styrene-butadiene-styrene block polymer with a butadiene portion of 10 to 40% and containing 5 to 25% by weight of a stereospecific liquid low-viscosity polybutadiene having a molecular weight of 1000 to 4000 and a viscosity of 700 to 3000 mPas and which further comprises a straight-chain or branched aliphatic hydrocarbon compound having a formula ranging between $C_{18}H_{38}$ to $C_{43}H_{88}$.

* * * * *